(12) United States Patent
Lisitsa et al.

(10) Patent No.: US 6,766,407 B1
(45) Date of Patent: Jul. 20, 2004

(54) INTELLIGENT STREAMING FRAMEWORK

(75) Inventors: Rafael S. Lisitsa, Bellevue, WA (US);
Dale A. Sather, Seattle, WA (US);
Costin Hagiu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 09/818,345

(22) Filed: Mar. 27, 2001

(51) Int. Cl.[7] .............................................. G06F 15/173
(52) U.S. Cl. ...................................... 710/316; 709/241
(58) Field of Search ................................ 709/238–242; 710/100, 316, 317

(56) References Cited

U.S. PATENT DOCUMENTS

| | | | | |
|---|---|---|---|---|
| 5,577,029 A | * | 11/1996 | Lu et al. ...................... | 455/445 |
| 5,754,543 A | * | 5/1998 | Seid ............................ | 370/351 |
| 5,995,503 A | * | 11/1999 | Crawley et al. ............. | 370/351 |
| 6,112,239 A | * | 8/2000 | Kenner et al. ............... | 709/224 |
| 6,151,319 A | * | 11/2000 | Dommety et al. ..... | 370/395.52 |
| 6,212,171 B1 | * | 4/2001 | LaFollette et al. .......... | 370/257 |
| 6,377,972 B1 | * | 4/2002 | Guo et al. ................... | 709/201 |
| 6,542,469 B1 | * | 4/2003 | Kelley et al. ................ | 370/238 |
| 6,628,629 B1 | * | 9/2003 | Jorgensen .................... | 370/322 |
| 6,633,544 B1 | * | 10/2003 | Rexford et al. .............. | 370/238 |
| 6,643,259 B1 | * | 11/2003 | Borella et al. ............... | 370/231 |
| 6,646,989 B1 | * | 11/2003 | Khotimsky et al. .......... | 370/238 |

OTHER PUBLICATIONS

HAVi Specification, Version 1.0 beta, Nov. 19, 1998, pp. 1 and 288–301.

* cited by examiner

*Primary Examiner*—Paul R. Myers
(74) *Attorney, Agent, or Firm*—Leydig, Voit & Mayer, Ltd.

(57) ABSTRACT

The present invention analyzes a user's or client application's requirements and searches for a solution based on the end-to-end latency requirements (requested or derived), data formats, control protocols, timing and synchronization, local streaming, and resource availability. The search for a solution is tracked to allow backtracking from the point of no solution. Once a solution is determined, the system translates the solution into requirements for the individual components of the graph.

53 Claims, 8 Drawing Sheets

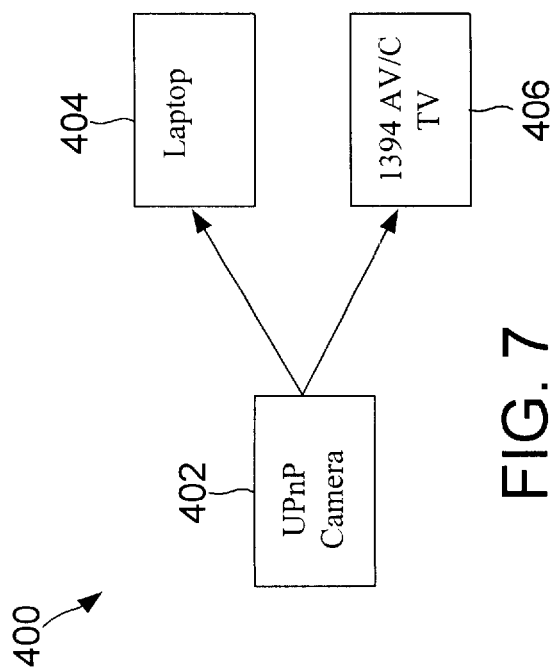
FIG. 7
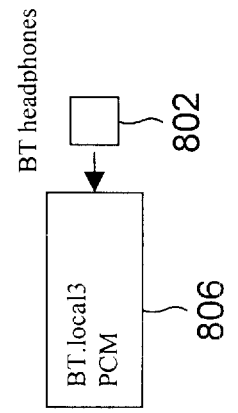
FIG. 8
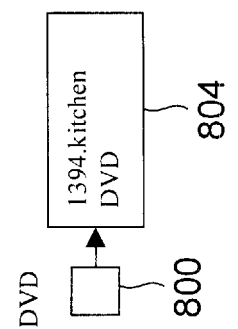

INTELLIGENT STREAMING FRAMEWORK

TECHNICAL FIELD

This invention relates generally to electronic data processing, and, more particularly, relates to managing the flow of streaming data in a network environment.

BACKGROUND OF THE INVENTION

Digitally based multimedia, the combination of video and audio in a digital format for viewing on a digital device is rapidly increasing in capacity and proliferation. Nearly every new personal computer manufactured today includes some form of multimedia. Sales of digital products such as cameras, video recorders, phones and televisions are steadily increasing. Multimedia is also becoming increasingly prevalent in the Internet realm as the growth of the Internet steadily and rapidly continues. Along with this growth has come increased performance expectations by the users of such computer equipment. These increased user expectations extend not only to hardware capability, but also to the processing capability of the data itself.

A technique known as streaming has been developed for multimedia applications to satisfy these increasing expectations. Streaming allows data to be transferred so that it can be processed as a steady and continuous stream. This has the benefit that data can be displayed or listened to before the entire file has been transmitted, a must for large multimedia files.

Initially, the streaming framework consisted of a chain of data processing modules (e.g., capturing filters, transformation filters, and rendering filters) with very little intelligence from the chain manager. The data processing modules, also called filters, make the decisions on how to get connected, what data formats to use, and how to control each other. During connection of filters in a chain, protocols define a predefined fixed sequence of data flow and control connection negotiations. A typical negotiation sequence is to negotiate the following in order: the interface, the medium, the data format, the allocators, and the master clock. The data processing chain provides an end to end solution within a computer system.

As the complexity of streaming increased, the industry recognized that it became necessary to optimize the processing chains that were processing data with real-time constraints such as video and audio processing chains. The Microsoft Windows operating system by Microsoft Corporation, for example, separates user mode and kernel mode. Filters operated entirely in user mode and called into the kernel mode to control the hardware to perform many of the functions needed to stream data. A stream class driver was developed to enable kernel mode streaming, which allowed greater efficiency and reduced latency over the previous generation of filters that operated entirely in user mode. As client and application requirements continued to change, it became clear that an even smarter framework was needed.

Industry responded in several ways. One way is the development of high-speed serial buses to interconnect between components on the same backplane, components on other backplanes, and external peripherals. These high-speed buses are used to increase data transfer speeds. One of the most prevalent buses is the IEEE 1394 standard (the "1394 bus"). Architectures such as the Home Audio/Video Interoperability Architecture (also called the HAVi Architecture) were developed to utilize the 1394 bus. The HAVi Architecture uses the JAVA programming language and connects to 1394 nodes first. However, these architectures introduced unnecessary limitations. For example, if the 1394 bus will not work for what is required (e.g., IP based streaming), the HAVi Architecture defers to a bridge to take control and handle what is needed. The preference for first connecting to the 1394 bus can result in situations where the 1394 bandwidth is being used by clients that do not need the speed of 1394 while clients that do need the speed are unable to access the bandwidth required for their application.

Another way that industry responded was the development of the JAVA Media Framework. The Java Media Framework was developed to incorporate time-based media processing into Java applications. The JAVA Media Framework requires a single master clock to be used, which places constraints on the types of "building blocks" one can use.

Another way that industry responded was the development of new standards and topologies to better control streaming data. Commonly assigned patent application Ser. No. 09/310,610 "Improving the Flow of Streaming Data through Multiple Processing Units," filed May 12, 1999, introduces the concept of data pipes for enhancing the data flow of streaming-data frames through a chain of interconnected modules in streaming-data environments in a personal computer. The data pipes avoid redundant storage and copying of data as a number of modules process the data frames, and streamline allocation of the frames in which the data is packaged. Another commonly assigned patent application Ser. No. 09/310,597, "Improving the Control of Streaming Data through Multiple Processors," filed May 11, 1999, provides a mechanism for controlling the flow of frames through multiple modules in a personal computer by improving the control from a chain-wide perspective, rather than optimizing each individual module separately. Any control component in the chain that is unnecessary to the overall operation of the graph is removed and the remaining components are then connected directly to each other. Commonly assigned application Ser. No. 09/310,596 "Efficient Splitting and Mixing of Streaming-Data Frames for Processing Through Multiple Processor Modules", filed May 11, 1999, presents a mechanism for splitting a single frame of streaming data into multiple frames and for combining, merging, or mixing multiple streaming data frames into a single frame. Commonly assigned application Ser. No. 09/511,457 "Adaptive Control of Streaming Data in a Graph", filed Feb. 23, 2000, provides a mechanism in a personal computer that provides timing and synchronization of streaming data flowing through a chain that has multiple modules and multiple clocks.

However, a wide variety of different formats and buses are now available to stream the data making it difficult to uniformly process this data. Additionally, a wide variety of different methods of compression and decompression of audio and video data and software have been created, which further complicates the processing of streaming data. For example, video data might be in ASF, WMA, AVI, CIF, QCIF, SQCIF, QT, DVD, MPEG-1, MPEG-2, MPEG-4, RealVideo, YUV9, or any other type of format. Audio data might be in MP3, AIFF, ASF, AVI, WAV, SND, CD, AU or other type of format. In many scenarios, different types of modules and devices within the network system need to be connected together to process the streaming data. For example, an audio and video clip might initially require MPEG decoding in a dedicated hardware module residing on a first network based on a first clock (e.g., 1394), rasterizing of the video fields in another hardware module, digital filtering of the audio in a software module, insertion of subtitles by another software module, parsing of the audio data to skip silent periods by a software module, D/A conversion of the video in a video adapter card residing on a second network (e.g., laptop) based on a second clock, and D/A conversion of the audio in a separate audio card on the second network based on a third clock. Users now expect these requirements to be implemented quickly and with minimum interruption.

Accordingly, there exists a need for a multimedia data streaming system that is capable of handling multiple networks (e.g., transports), data formats, control protocols, and clocks and that is capable of configuring modules and devices with minimal user input.

SUMMARY OF THE INVENTION

In view of the above described problems existing in the art, the present invention provides a system that analyzes the user requirements and searches for a solution based on the user requirements, end-to-end latency requirements (requested or derived), data formats, buses, gateways, control protocols, timing and synchronization, local streaming, and resource availability.

The invention works with network standards on any operating system and provides a mechanism for searching for a solution that is directed by user requirements, end-to-end latency requirements (requested or derived), data formats, buses, gateways, control protocols, timing and synchronization, local streaming, and resource availability discussed above. The search process is tracked to allow backtracking from the point of no solution. For example, if a gateway is needed to connect between buses and a gateway is chosen that does not meet latency requirements, the search process is restarted at the point before the gateway was added to the search process. Once a solution is determined, the solution is translated into requirements for the individual streaming components. A streaming framework manager coordinates modules to achieve the desired streaming. The streaming framework manager relies on handlers to perform specific functions. These handlers are a resource manager, a data formats handler, a timing and synchronization handler, a local domain bus topology handler, a transport handler, and control handlers.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7 is a block diagram of an example of a user's request;

FIG. 8 is a block diagram illustrating a connectivity problem that the present invention solves;

DETAILED DESCRIPTION OF THE INVENTION

Figure 1:
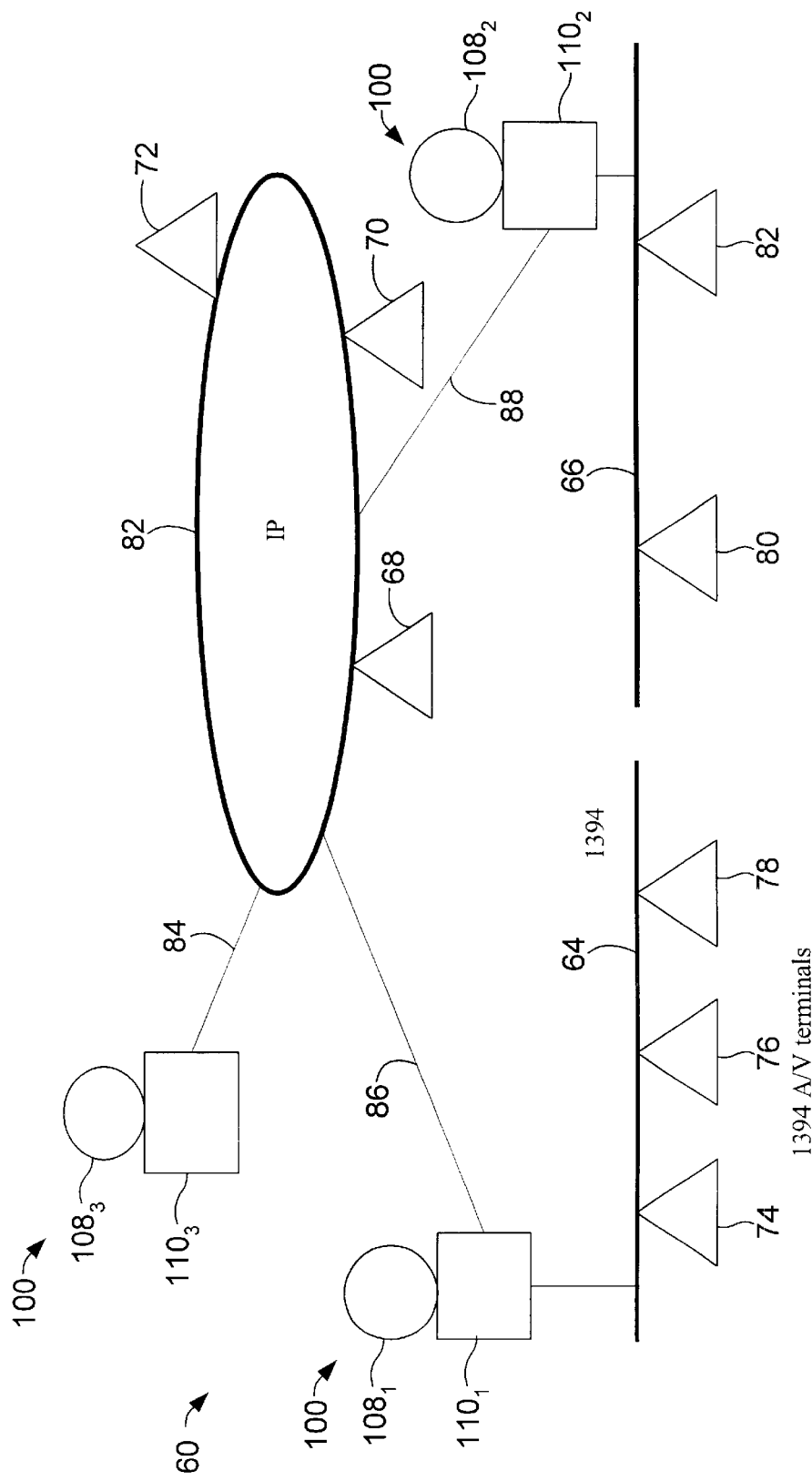
FIG. 1 is a block diagram generally illustrating an exemplary network environment in which the present invention operates.

The present invention solves the problem of propagating one or more multimedia streams originating in stored content or from live sources through processing modules and rendering these streams on certain devices or storing them on certain media according to a client's intent. The data streams are moved from the source points to the sink (i.e., destination) points. In the process, transformations are applied to the data streams that are requested by the client or necessary for successful operation (e.g. modifying the encoding of a source stream to match the encoding accepted by a sink point, merging/mixing two streams that target the same sink point, de-multiplexing a stream into two new streams with data format matching two different rendering points, etc.).

Stream sources are modules that output a digitized signal as a data stream. Common examples of data sources are audio/video capture cards, file readers, and network interfaces. The data stream consists of a sequence of signal samples encoded to a data format specification. Multiple successive samples are usually packaged together into a data frame and may be compressed. Stream sources may expose a clock as a time reference that has been used for sampling the original signal.

A stream sink consumes a stream of data. Examples of stream sinks are sound cards, network interfaces, and file writers. A stream sink may also expose a clock as a time reference that has been used for rendering the signal.

Turning to the drawings, wherein like reference numerals refer to like elements, the invention is illustrated as being implemented in a suitable network environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable network environment 60 in which the invention may be implemented. The network environment 60 is only one example of a suitable computing environment and is not intended to suggest any limitation as to the scope of use or functionality of the invention. The network environment 60 has IP backbone 62, a 1394 bus 64 and an other bus 66. The other bus 66 is used to represent buses other than 1394 buses that can be connected to the IP backbone. Connected to the IP backbone are IP audio/visual terminals 68, 70, 72. 1394 audio/visual terminals 74, 76, 78 and computer $110_1$ with local audio/visual peripherals $108_1$ are connected to the 1394 bus 64. Computer $110_2$ having local audio/visual peripherals $108_2$ and other audio/visual terminals 80, 82 are connected to the other bus 66. Stand alone computer $110_3$ having local audio/visual peripherals $108_3$ and computers $110_1$, $110_2$ are connected to the IP backbone 62 through connections 84, 86, 88. Connections 84, 86, 88 may be a wireless connection, a modem hookup, a direct link, etc. Each of the computers $110_1$, $110_2$, $110_3$ and associated local audio/visual peripherals $108_1$, $108_2$, $108_3$ comprise computing system environment 100. The present invention provides a user the capability to request that multimedia be streamed between two or more devices (e.g., audio/visual terminals 68–82, computer $110_1$, $110_2$, $110_3$, and local audio/visual peripherals $108_1$, $108_2$, $108_3$ and the like) without having to specify any connection details. Examples of audio/visual terminals that may be suitable for use with the invention include, but are not limited to, cameras, camcorders, wireless phones, handheld or laptop devices, set top devices, and the like.

Figure 2:
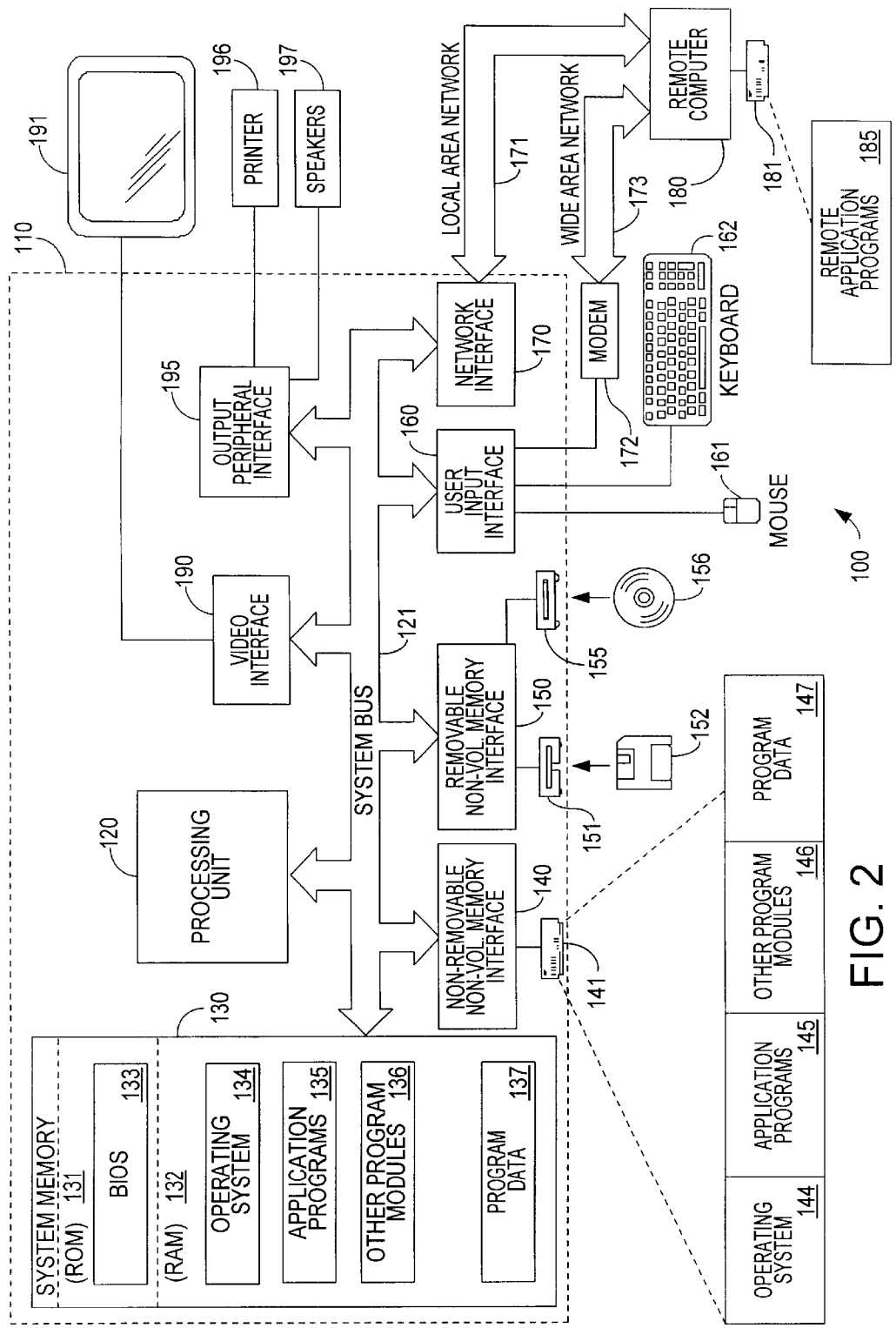
FIG. 2 is a block diagram generally illustrating an exemplary computer system on which the present invention resides.

FIG. 2 illustrates an example of the computing system environment 100 of FIG. 1. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via a serial port (not shown), the user input interface 160, or other appropriate mechanism. In a networked environment, program modules depicted relative to the personal computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
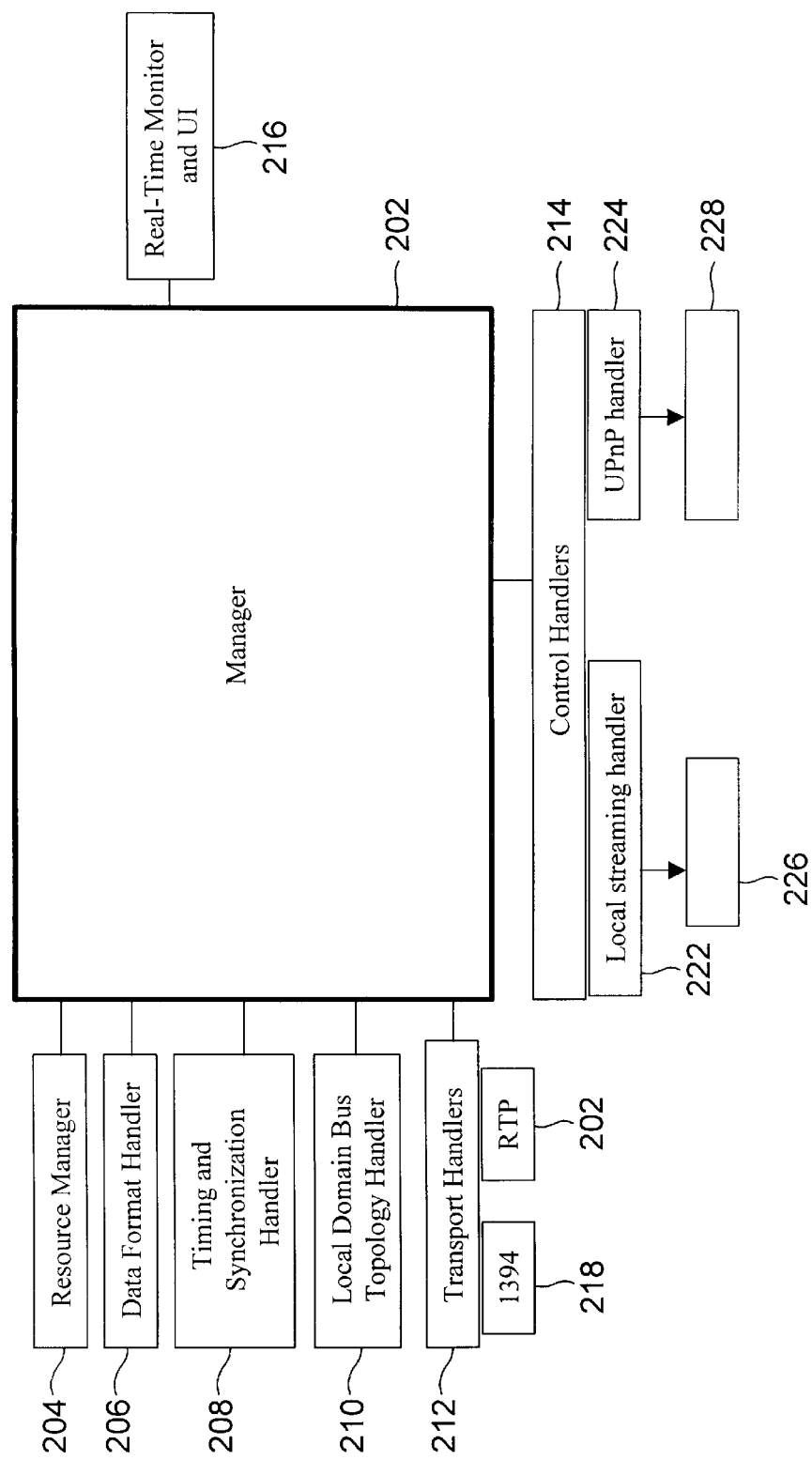
FIG. 3 is a block diagram generally illustrating the streaming framework architecture of the present invention.

FIG. 3 illustrates the architecture 200 of an embodiment of the invention. The architecture may be implemented in the computing system environment 100 and the like. In computing system environment 100, the architecture may be implemented in operating system 134, 144, application programs 135, 145 and other program modules 136, 146. In the architecture 200, manager module 202 implements the subsystem that builds and manages streaming data devices (and modules) and connections between devices. The streaming data devices and connections comprise a graph. The manager module 202 utilizes other managers and handlers to build the graph. The managers and handlers are resource manager 204, data format handler 206, timing and synchronization handler 208, local domain bus topology handler 210, transport handlers 212, and control handlers 214. The manager module 202 exposes real-time monitor and UI (user interface) 216 to provide visualization, logging, tracing, and control tools to clients. While FIG. 3 shows separate managers and handlers, it should be understood that a single manager module could be used to implement the present invention and that additional manager and handlers can be added to the present invention.

Resource manager 204 manages hardware and software resources in multi-tasking multi-user systems. The resource manager 204 accumulates an accounting of the resources required for a given graph, determines if those resources are currently available given the quantity of any given resource that is generally available, the quantity of any given resource that is currently consumed by activities of equal or higher priority, and the user's permission to consume available resources. In one embodiment, the resource manager 204 performs resource planning, which provides the resource evaluation of graphs against a timeline of resource consumption in order to determine if the resources required for a graph will be available at some time in the future. This spares the user the experience of scheduled commitments that cannot be realized when they are scheduled to occur. The manager module 202 uses resource manager 204 to determine if the graphs it produces consume more resources than are available given resource constraints. If a graph would consume more resources than are available, the graph is rejected in advance, thereby sparing the user the experience of failed attempts to build a graph. The resource manager 204 also provides manager module 202 the capability to revoke the use of resources by low-priority activities. In such instances, the low-priority activity is either realized through another configuration that does not violate current resource constraints, temporarily suspended, or canceled entirely.

Data formats handlers 206 provide data type specific operations that are commonly used in all modules that deal with a data type (e.g., audio, video, MIDI). The data format handler 206 encapsulates information specific to a data type that would otherwise have to be incorporated into each module (e.g. filter) that processes that particular data type. Additionally, data format handler 206 can be more specific to a type of video data, such as MPEG2.

The data format handler 206 is utilized in many situations and fulfills many functions. This provides the advantage that modules only need to implement unique features rather than all features of a data type. For example, some of the services the data format handler 206 provides are services such as translating time and space, validating and translating frames, and providing descriptor information. The translating time and space service performs such functions as determining how much memory is required to store a specified amount of time-based data, determining how much data corresponds to a given amount of time, how incoming timestamps and durations translate to outgoing timestamps and durations, and other types of scaling operations. The validating and translating frames service performs such functions as validating frame size and alignment based on negotiated framing and/or timing interval, interpreting and migrating flags on frames, negotiating framing based on data format restrictions such as size, stepping, alignment, and compression. The descriptor information provided is data specific dynamic module descriptor and constraint information based on module constraints. Other services the data format handler 206 may provide include validating data formats and automation. The validation of data formats occurs when a new format is set on a module's input connection (e.g., a pin) or on an output connection and when creating a data format intersection (i.e., at a transformation module where an input data format is transformed into an output data format). When a new format is set on a connection, the data format handler 206 validates the new format based on current constraints and incorporates the new format as a new constraint. When creating a data format intersection, the data format handler 206 validates the data formats being used and provides intersections of data formats.

The timing and synchronization handler 208 is responsible for configuring, capturing, and rendering clocks, presentation clocks, reference clocks, and rate-matchers to insure synchronization between media streams where required (e.g., synchronizing audio and video on a television) and presentation quality. Further information on clocks and rate-matching is provided in commonly assigned U.S. Pat. No. 6,594,773 "Adaptive Control of Streaming Data in a Graph", issued Jul. 15, 2003, hereby incorporated by reference.

The local domain bus topology handler 210 is used to find optimal paths between devices based on knowledge of local buses topology such as Ethernet, wireless, 1394 segments and the like. Local domain bus topology handler 210 is typically used in environments where many interconnected busses are utilized (e.g., a complex topology).

The transport handler 212 is used to determine the transport configuration for each device in the graph and to configure connections for devices on the devices' respective medium. Each transport handler 212 knows details about a particular transport and decides how to implement the data transfer. The 1394 transport handler 218 knows the details on transporting data using the 1394 bus and the RTP transport handler 220 knows the details on transporting data using RTP. For example, the 1394 transport handler 218 knows the IEC 61883 interface standard for 1394 transports and its bus operations modes (isochronous, broadcast, etc.) and bus reservation policies. Based on the bus reservation policies, 1394 transport handler 218 decides how to implement intended transfers such as using isochronous broadcast mode to optimally deliver data. While not shown, it is understood that the present invention works with other transport handlers.

The control handlers 214 control devices and streaming graphs. Local streaming handler 222 controls the devices that are local to the manager module 202 and UPnP handler 224 controls UPnP (Universal Plug and Play) devices. Local streaming handler 222 controls device 226 and UPnP handler 224 controls UPnP device 228. While not shown, it is understood that the present invention works with additional control handlers.

Figure 4:
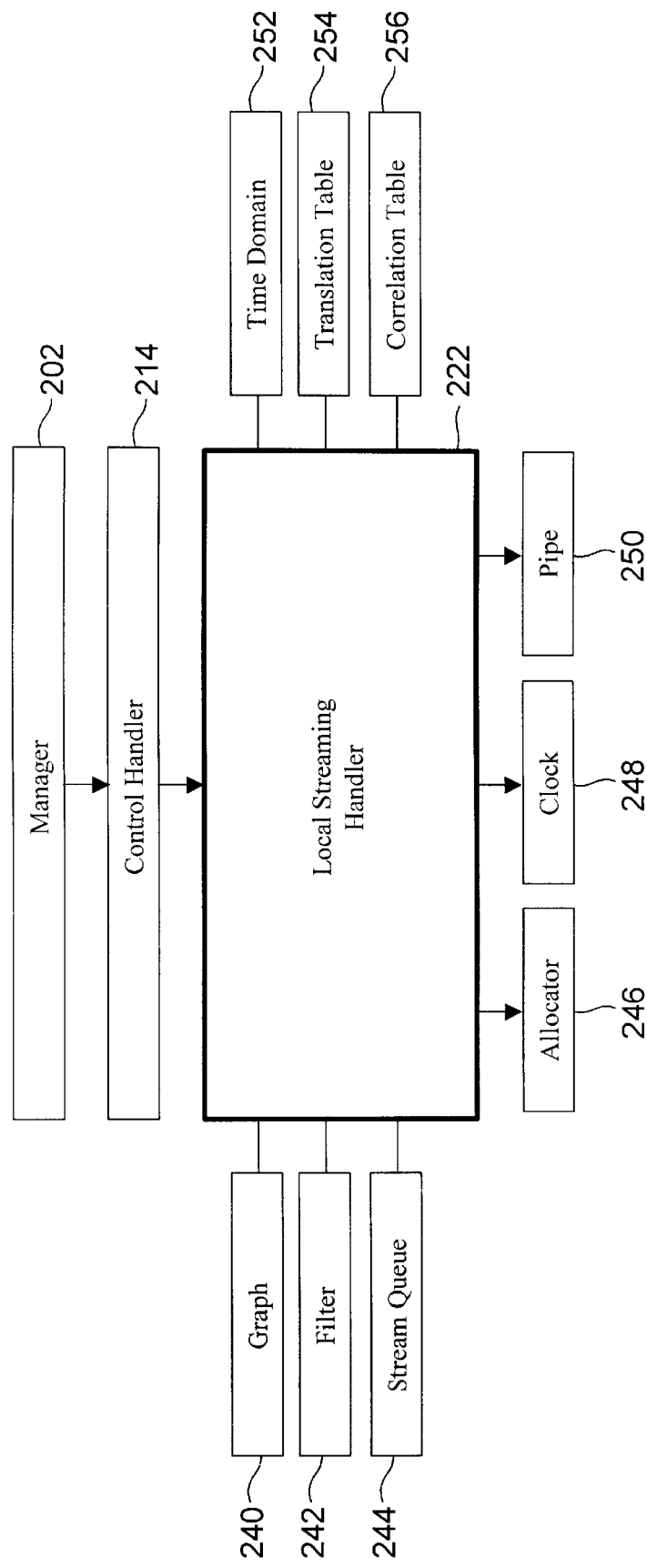
FIG. 4 is a block diagram generally illustrating the local streaming handler architecture of the present invention.

Turning now to FIG. 4, the local streaming handler 222 defines data stream processing points as filters. Each filter accepts one or more input streams and processes them to emit one or more output streams. A filter is described by its input and output streams, the valid combinations of data formats on those streams and a set of processing capabilities. Filter processing capabilities are used by local streaming handler 222 to configure filter processing.

A buffering mechanism may be needed between any stream's output and the related stream's input if there is a difference between the rate with which one filter outputs data and the rate the next filter processes it. Streaming queues 244 are the local streaming handler's components that take care of buffering. A queue will hold the data frame delivered by an output stream that is not yet completely processed by the associated filter's input stream. Local streaming handler 222 is responsible to move data frames to the next queue upon completion of their processing by an upstream filter and to invoke the next filter's processing when new frames arrive in the next filter's input queue. In situations where a filter needs multiple data frames from a stream to perform its processing, the filter also interacts with a queue to modify the set of data frames involved in processing.

Based on the processing configuration of every filter, local streaming handler 222 identifies processing segments inside the streaming graph where data frames share one common physical memory block, even if its content and extent changes. This processing segment in a graph is called a data pipe. An allocator 246 provides the memory used for holding the data frames that moved along a pipe. Allocators 246 can be provided by stream sources, sinks, filters or the local streaming handler 222 and the pipes 250 are used to minimize the number of data copies, which results in decreased processing requirements and increased cache coherency. Cache coherency is used to describe a performance characteristic in which the use of smaller amounts of memory in some aspect of processing results in fewer transfers between main memory and cache memory.

The local streaming handler 222 uses the concept of time domains. A time domain is a stream or set of streams whose data samples' time stamps correspond to a common clock. Local streaming handler 222 configures the graph so that streams are rate-matched when they cross time domain boundaries. This overcomes the problems that occur when a data stream originates at a live source (e.g. producing samples according to a source's own time reference) and terminates at a live sink (e.g. consuming data based on the sink's own time reference). In such situations the principle problems are that the data stream could be produced and consumed at different rates, causing signal samples to be rendered at a different rate than they were captured, resulting in underruning and overruning conditions.

The local streaming handler 222 coordinates multiple objects in order to achieve a desired data streaming operation. These objects implement specific functionality and may be exposed either by the local streaming handler 222 or by a third party provider that will register the modules with the local streaming handler 222. The objects are a graph object 240, filter object 242 (sources, sinks, transforms), stream queues object 244, allocator object 246, clock object 248, pipe object 250, time domain object 252, translation table object 254, and correlation table object 256.

Graph object 240 is a top-level object used to manage information about underlying streaming processing topology including filters, connections between an upstream filter's output streams and a downstream filter's input streams, a pipe configuration and a time domain configuration. The graph object 240 is used for controlling graph-wide operations such as state transitions.

The graph object 240 exposes graph interfaces that allow a client to learn about graph topology. The graph interfaces enumerate the filters belonging to a graph, find a filter based on filter id or filter properties, find what filters are connected to a certain filter and through what streams, find what queue is associated with a certain stream between two filters, enumerate time domains, enumerate pipes, and control processing state (start playing, pausing, stopping).

A filter object 242 performs processing on the data streams. Filters are categorized into three different categories. These categories are source filters, sink filters and transforms. Source filters are the points where data streams are entering the graph and source filters only have output streams. Sink filters are points where data streams are exiting the graph and they only have input streams. Transform filters will have any combination of input and output streams and they process the input streams according to a predefined algorithm to obtain the output streams.

Filter objects 242, especially live sources and live sinks, may expose a clock used to time stamp or render data stream samples processed by the filter object 242. Filter objects 242 may also accept an other component's clock as a master clock. This occurs when a filter object 242 processes data streams based on the progression of the master clock. A filter object 242 also exposes its preferred queues and allocators to allow optimization of the graph.

A filter object 242 exposes a capabilities interface, a configuration interface, a processing interface, and a notification interface. The capabilities interface is used to learn about a filter's capabilities. The information provided through the capabilities interface includes information about the number of input and output streams of the filter object, acceptable combinations of data formats for input and output streams, memory preferences and restrictions, rate matching and synchronization possibilities, and the like. The configuration interface is used to configure a filter to perform certain functions including timestamping with a provided clock, rate-matching with specified parameters, and slaving to a specified clock. The processing interface is called by local streaming handler 222 when there is enough data available in a filter's input queues and enough frames in its output queues so that the filter can process the input data. The notification interface is used by source filter objects that manage memory allocation to notify the local streaming handler 222 when a new data frame is available.

The stream queue object 244 implements a buffering mechanism to store stream data frames between the moment when an upstream filter outputs them and the moment when a downstream filter completes its processing. The stream queue object 244 provides a FIFO interface and a data interface. The FIFO interface is used to move a data frame from its current queue location to the data frame's next queue location when a filter marks the data frame as processed. The data interface is used by a processing module to control the processing window in the module's input and output queues. The data interface provides a filter object 242 the option to access multiple data frames from its queues in one processing step.

An allocator object 246 implements memory management modules. The function of the allocator object 246 is to manage the memory used for data frames. The allocator object 246 provides an allocation interface that is used to allocate and free the memory for data frames.

The clock object 248 represents a time reference. Clock objects are used to obtain current time readings or to provide notifications when their time reaches a certain value. A clock object 248 may expose a physical time reading and a presentation time reading. A physical time reading represents the regular progression of a time source (e.g. based on a quartz oscillator). A presentation time reading represents the time-stamp of the current sample being processed at the processing point that exposes the presentation clock. A clock object 248 exposes clock interfaces to read clock's physical or presentation time and to notify when clock's physical or presentation time reaches a certain value.

A pipe object 250 represents graph segments in which data frames are processed in-place. The pipe object 250 defines bus types, memory type, data frame size range, compression/expansion ratio between pipe termination points, number of frames, frame alignment, etc. A pipe object 250 exposes a pipe interface that allows a user to enumerate the filters and the streams that belong to the pipe, to find the memory allocator used for data frames circulating inside a pipe's boundaries, and to get information about pipe configuration parameters (e.g., relations of filters to streams to stream queues to allocators)

A time domain object 252 represents a graph segment where a stream samples' time stamps correspond to a common clock. The time domain interfaces exposed by a time domain object 252 enumerate the input and output streams belonging to a time domain and find the filters that are junction points between specified time domains.

A translation table object 254 is associated with a junction point between two time domains. The translation table object 254 stores necessary information to translate stream data time stamps corresponding to a common signal position between time domains. The translation table object 254 exposes a translation table interface that receives a time value from one time domain and that returns the corresponding time value for requested time domain.

A correlation table object 256 is associated with a set of clocks. The correlation table object 256 exposes an interface that is similar to the translation table interface above, but their functions are different. A correlation table object 256 holds corresponding readings from multiple physical clocks sampled with a specific interval. This object computes the physical time of a requested clock based on a known time from a related clock.

The local stream handler 222 solves the problems related to the local graph-wide context. Two important aspects for the correct operation of any processing graph are only effectively addressed by the local stream handler 222. These aspects are flow control and synchronization.

The flow control used is dependent on the quality and latency requirements of the graph and the control mechanisms of the filters within the graph. Conceptually, the graph-wide data flow control defines the size of streaming data frames (in terms of both time and space) and how often the streaming data should be moved between processing nodes. Generally, bigger frames imply greater latency and smaller frames imply greater transport overhead. Several factors contribute to the data flow performance. These factors include data format, memory type, frame size range, bus type, compression/decompression performed by a filter object, and whether in-place transformations are used. For example, compressed data formats allow the movement of more data than uncompressed data formats, one memory type can be accessed faster than another memory type, and one frame size range can be better for certain hardware types or software algorithms than another frame size range. Some hardware types have physical memory limits that have to be considered. Additionally, in-place transforms minimize the amount of data copies and/or number of memory allocations and result in higher cache coherency. In-place compression/decompression performed by a filter object 242 minimizes the amount of data copies and/or number of memory allocations and result in higher cache coherency, certain buses are faster then others, etc.

In order for graph processing to work, there must be at least one way to propagate the streaming data throughout the entire graph that complies with the specific capabilities of each filter in the streaming path. For example, there must be an allocator that will provide data frames satisfying both stream endpoints' framing constraints for each connection between an output stream of upstream filter and an input stream of downstream filter.

Synchronization is the requirement that certain events occur at a certain time or at a certain rate within a specified tolerance. In multimedia streaming, a client may want two or more streams to be presented in synch (e.g. video and audio), and/or the client may want to present one stream relative to some predetermined time, with some specified tolerance, relative to the specified clock (e.g. audio playback from an audio file).

There are two aspects to stream synchronization. The first aspect is that each data stream should be associated with a time reference (clock) that is the most appropriate for interpreting its samples' time stamps. The second aspect is that the streaming graph should be configured so that the time stamps of the processed data samples satisfy a certain relation at specific points in the graph and at a certain moment. For example, the time stamps of audio and video samples in a graph that are rendered at the same moment should not differ by more than 20 ms.

Time domains are used to address the time reference aspect because a time domain will hold, by definition, the set of all filter connecting streams that should be associated with a common clock. In one embodiment, the algorithm used to compute time domains bases decisions on the following rules.

1. Two stream endpoints belonging to the same filter are independent stream endpoints when the underlying filter is able to rate match the streams passing through the two stream endpoints.
2. The starting points for time domains, if any, are established. If there is no stream endpoint in the graph associated with a clock, the graph is free-running and no time domains computations are performed.
3. If a stream endpoint A exposes a clock C1, then stream endpoint A belongs to a time domain T1 defined by the clock C1.
4. In the context of a given filter, if a stream endpoint A belongs to a time domain T1, then any other stream endpoint B that cannot be independent of A also belongs to time domain T1.
5. If a stream endpoint A belongs to time domain T1, stream endpoint B is connected to A and B does not belong to any time domain, then B also belongs to time domain T1.
6. If a stream endpoint A belongs to time domain T1, stream endpoint B is connected to A and B belongs to a different time domain T2:
   If either one of the stream endpoints exposing clocks C1 and C2 can slave to the other clock, then time domains T1 and T2 will be merged into a single time domain defined by the clock assigned as a master clock.
   If neither of the clocks C1 and C2 can be slaved to the other clock, a rate matcher filter is inserted between those two stream endpoints to properly join the time domains so that the graph will avoid underrun/overrun conditions at run-time.
7. If there are still streams that have not been assigned to a time domain, a stream is assigned to a time domain according to the following rule. In the context of a given filter, if a stream endpoint A belongs to a time domain T1, then any other stream endpoint B that can be independent of A and that does not already belong to a time domain may also belong to time domain T1.

In one embodiment, the aspect of configuring a streaming graph so that the time stamps of the processed data samples satisfy a certain relation at specific points in the graph and at a certain moment is accomplished by selecting a master filter among the points to be synchronized and having the other filters' (i.e., slave filter) processing follow the progress of the master filter processing. The progress of a filter's processing is exposed through a presentation clock. The time reading of the presentation clock is equal to the time stamp of the current processed data sample. A slave filter that belongs to the same time domain of the master filter directly accesses the master filter's presentation clock to directly correlate the master clock time readings with time stamps on the slave filter's own streams. If the master clock belongs to a different time domain, the local streaming handler 222 exposes a presentation clock that translates the values of the master clock time into the slave filter's time domain. The presentation clock is built by finding a series of time domain junctions between the master time domain and the slave time domain and building a list of translation tables associated with the time domain junctions. The list of translation tables is used for translating (through successive steps) a value read from the master clock into the corresponding value in the slave time domain.

Figure 5:
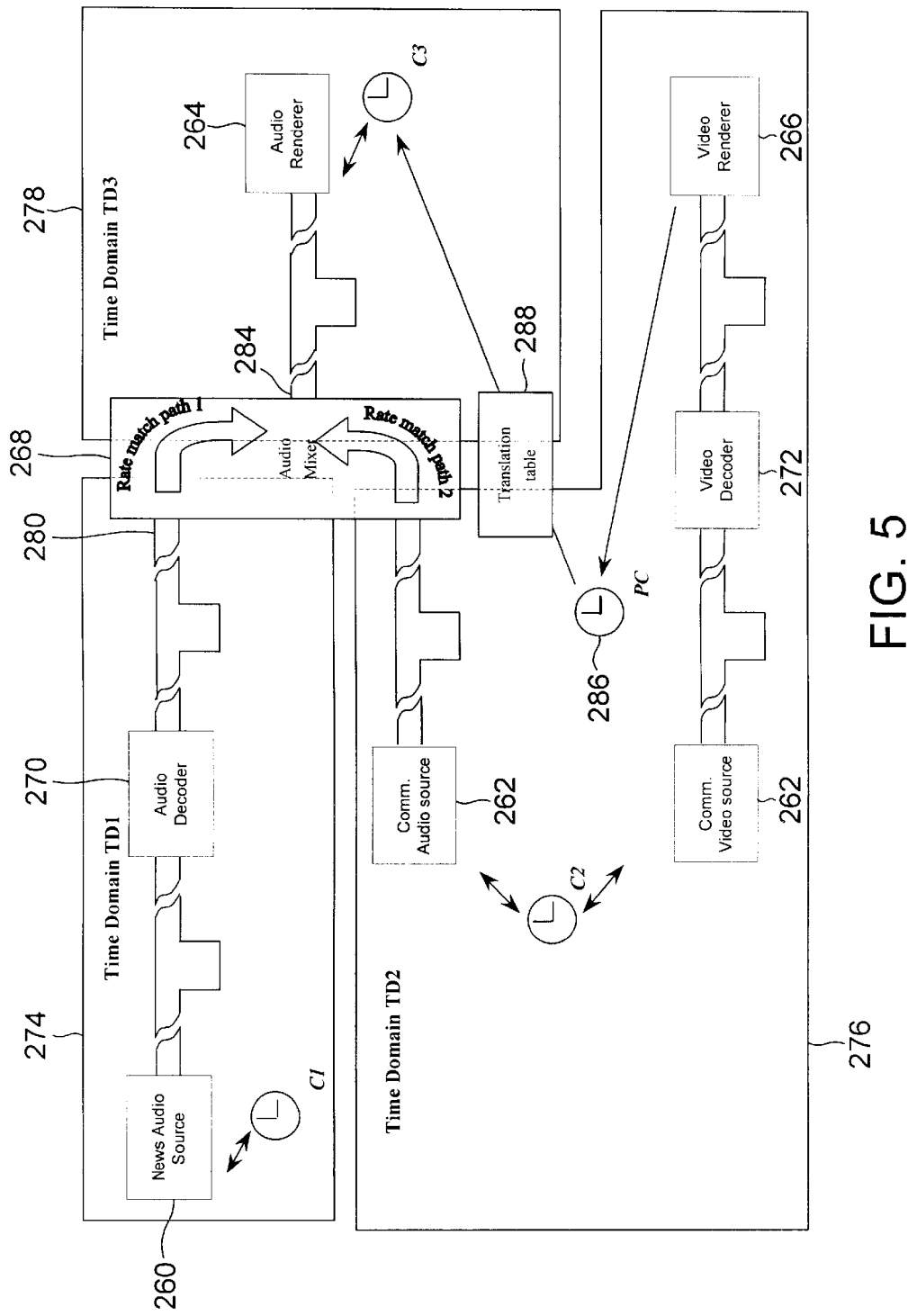
FIG. 5 is a block diagram illustrating an example of a solution provided by the local streaming handler.

FIG. 5 and the following example are used to provide a better understanding of the operation of the local streaming handler 222. A client (e.g., module 202) requests the local streaming handler 222 to build a graph that receives an audio stream from a news audio source 260 and a pair of audio and video streams from a communication interface 262. The streams are to be rendered on a system's audio renderer 264 and video renderer 266. The two audio streams are rendered at the same point and they need to be mixed by an audio mixer 268 inserted before the audio renderer 264. An audio decoder 270 is inserted between the news audio source 260 and audio mixer 268. A video decoder 272 is inserted between communication video source 262 and the video renderer 266.

The time domain configuration algorithm will determine that there are 3 possible time domains. These time domains are time domain 274 associated with clock C1 exposed by the news audio source 260. Time domain 274 initially contains the output stream of the news audio source 260. Time domain 276 is associated with clock C2, which is associated with both communication sources. Time domain 276 contains the output streams of the communications audio source and video source. Time domain 278 is associated with clock C3 that is exposed by the audio renderer 264 and contains the input stream of the audio renderer 264.

The audio mixer 268 can rate match the audio streams between its input streams and its output streams. This means that the input streams are independent from the output stream as previously defined. The audio decoder's input stream is associated with the output stream from news audio source 260. Therefore, it belongs to time domain 274. The audio decoder's output stream is not independent from its input stream. Therefore, it also belongs to time domain 274. The audio mixer input stream 280 also belongs to time domain 274 because the audio mixer input stream 280 is associated with the audio decoder's output stream. Time domain 276 will contain the output stream from communication audio source and its associated input stream and the audio mixer input stream 282. The communication video source output pin, both video decoder's input and output streams (since there are not independent) and video renderer's input pin also belong to time domain 276. The audio mixer's output stream 284 and audio renderer's input stream belong to time domain 278.

The audio mixer's first input stream 280 and its output stream 284 belong to different time domains. As a result, the audio mixer 268 is configured to rate match its first input stream 280 based on the relative progression of C1 and C3. Similarly the audio mixer 268 is also configured to rate match its second input stream 282 based on the relative progression of C2 and C3.

The synchronization requirement of the graph is that audio renderer 264 and video renderer 266 process their incoming streams in synch. The local streaming handler 222 determines that video renderer 266 can slave to a foreign clock. As a result, video renderer 266 will be configured to slave its processing to audio renderer's presentation clock C3. This cannot happen directly because the audio renderer's presentation time is reported in C3 domain time and does not match the time stamps on video samples because time domain 278 is based on signal timestamps that were adjusted when audio streams 280, 282 were rate matched by the audio mixer 268. The local stream handler 222 builds and exposes a presentation clock 286 that translates the C3 presentation time readings into time domain 276 by using the translation table 288 produced by the audio mixer 268 during rate matching. The presentation clock 286 is assigned as a master clock to video renderer 266.

Figure 6:
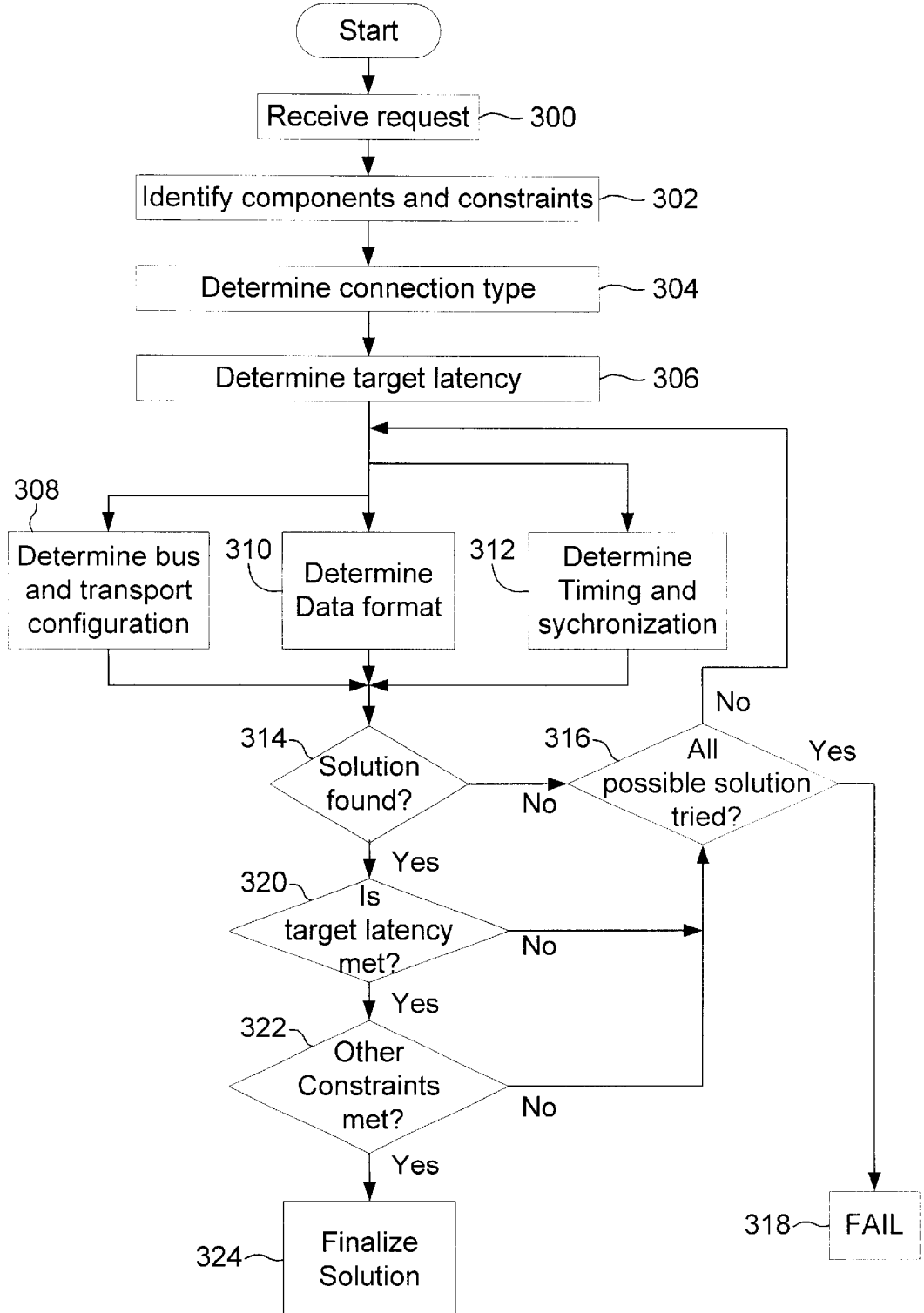
FIG. 6 is a flow chart of a method of connecting streaming components in accordance with the present invention.

Now that the architecture 202 has been described, the steps taken in synthesizing a solution will now be described. FIG. 6 illustrates the steps taken in the analysis and the synthesis of the graph are shown. While FIG. 6 shows steps in sequence and in parallel, it should be noted that steps may be done differently (e.g., parallel steps done sequentially and sequential steps done in parallel) and in different order. Each change to the graph topology (e.g., connections, disconnections, inserted or deleted modules, etc.) is recorded such that the graph prior to any change can be undone if no solution is found. This allows backtracking of an attempted solution path that resulted in no solution or that resulted in a solution that fell outside of constraints (e.g., latency requirements not met) to a point in the solution path where other possible solutions could be found.

The steps taken in the analysis and the synthesis of the graph involve first receiving a request from a client application or a user (step 300). The request contains an initial topology and constraints. From the request, components (i.e., devices and modules) and any constraints are identified (step 302). The constraints may be as simple as using a particular component (e.g., the television in the kitchen) to a detailed description of the devices, data formats, timing constraints, etc. An example of a simple request 400 is shown in FIG. 7.

In FIG. 7 a user or client application has requested that audio/visual streams from the UPnP camera 402 be played on the laptop 404 and the 1394 television 406. In one embodiment, the request is in an XML format as shown below.

```
<streamingObject autoplay="true">
    <node ID="camera">
        <upnpSource address="...")/>
    </node>
    <node ID="laptop">
        <abstractDest>default-display <abstractDest/>
    </node>
    <node ID="tv">
        <upnpSource address="...")/>
    </node>
    <connection src="camera" dest="laptop"/>
    <connection src="camera" dest="tv"/>
</streamingObject>
```

In this example, the node elements call out the endpoints of the desired graph. Identifiers (ID) are supplied to name the node in the context of the request. Child elements of the node elements (e.g., <upnpSource address=" . . . "/>) describe the node in question. In this example, two nodes, the UPnP camera 402 and the 1394 TV 406 are identified by their UPnP identifiers. If the request is issued at the laptop 404, the laptop display is identified simply as the default-display. The connection elements indicate how the nodes are to be interconnected.

In the embodiment of the above example, the devices are described in XML and allow users to specify their intent in more detail or do nothing and use the defaults. In one embodiment, the UPnP camera 402 is expressed as follows.

```
<streamingDevice type="camera">
    <interface name="UpnPCamera1.0"/>
    <referenced ID="transport61883">
        <transport>
            <61883 channel="...">
                <1394/>
            </61883>
        </transport>
    </referenced>
    <referenced ID="audioFormat">
        <format major="audio" minor="pcm">
            <representation> Integer </representation>
            <enum>
                <group>
                    <bits> 12 </bits>
                    <enum>
                        <channels> 2 </channels>
                        <channels> 4 </channels>
                    </enum>
                </group>
                <group>
                    <bits> 16 </bits>
                    <channels> 2 </channels>
                </group>
            </enum>
            <rate> 44100 </rate>
        </format>
```

-continued

```
    </referenced>
    <referenced ID="videoFormat">
        <format major="video" minor="rgb">
            <width> 320 </width>
            <height> 200 </height>
            <enum>
                <bitsperpixel> 16 </bitsperpixel>
                <bitsperpixel> 24 </bitsperpixel>
            </enum>
            <enum>
                <framespersec> 25 </framespersec>
                <framespersec> 30 </framespersec>
            </enum>
        </format>
    </referenced>
    <referenced ID="cameraNode">
        <node ID="camera" type="camera1234.5">
            <interface name="upnpCamera1.0"/>
            . . .
        </node>
    </referenced>
    <enum>
        <group>
            <reference ID="transport61883"/>
            <node ID="mic" type="microphone">
            <node ID="outTerminal" type="outTerminal">
                <reference ID="audioFormat">
            </node>
            <connection src="mic" dest="outTerminal"/>
        </group>
        <group>
            <reference ID="transport61883"/>
            <reference ID="cameraNode">
            <node ID="outTerminal" type="outTerminal">
                <reference ID="videoFormat">
            </node>
            <connection src="camera" dest="outTerminal"/>
        </group>
        <group>
            <reference ID="transport61883"/>
            <reference ID="cameraNode">
            <node ID="audioOutTerminal" type="outTerminal">
                <reference ID="audioFormat">
            </node>
            <node ID="videoOutTerminal" type="outTerminal">
                <reference ID="videoFormat">
            </node>
            <connection src="camera" dest="audioOutTerminal"/>
            <connection src="camera" dest="videoOutTerminal"/>
        </group>
        <group>
            <transport>
                <rtp rtcpLevel=". . ." ipAddress=". . ."/>
                <1394/>
            </rtp>
            </transport>
            <reference ID="cameraNode">
            <node ID="outTerminal" type="outTerminal">
                <format major="av" minor="mpeg2">
                    <profile> main </profile>
                    <enum>
                        <level> main </level>
                        <level> high </level>
                    </enum>
                </format>
            <node>
            <connection src="camera"dest="outTerminal"/>
        </group>
    </enum>
</streamingDevice>
```

The device description contains referenced elements, reference elements, enum elements, and group elements. Referenced elements contain text that is used in more than one place in the device description. Reference elements call out referenced elements to avoid duplication. Enum elements contain a list of options from which one option must be selected. Group elements group together multiple aspects that correspond to a single option. The user selects the specific options she wants and accepts the default selection if no option is selected.

The connection type (step 304) and target latency (step 306) are determined next. For streaming media, the connection types are audio only, video only, audio and video separately, and audio and video multiplexed. The target latency has a significant influence on the selection of the streaming solution. For example, for IP based connections without latency constraints (e.g. transferring files), there is no need to deploy any optimizations for data transport and processing. However, for real-time communications, transports and processing need to be optimized to meet low-latency requirements.

In many situations, the request does not specify formal latency constraints. For example, a home networking user will want to specify his intent to watch a movie. He doesn't understand how much latency is acceptable, and he should not be bothered with identifying a target latency requirement. The present invention derives a targeted latency based on the type of devices that are being connected. In one embodiment, if the connection is a one way communication between a live source and a live destination (e.g. a Nanny Camera), the target latency is selected to be approximately one second. If the connection is a two way communication between a live source and a live destination (e.g. an intercom), the target latency is selected to be approximately two hundred milliseconds. If the connection is from a storage device to a live destination (e.g. DVD playback), the target latency is selected to be approximately three seconds. If the connection is from a live device to a storage destination (e.g. live recording), the target latency is selected such that the storage device does not overrun.

The control configuration is determined next. There are many ways for a set of networked devices to work together to achieve a client's goal. For example, devices may have a master/slave control configuration (e.g., a PC controller and IP network speakers) or a peer-to-peer control configuration (e.g., two peer PCs using Voice over IP protocols). A plurality of networked devices may form a loosely-coupled set (e.g. a loosely-coupled audio/video conference between four PCs without any central server computer and without any central server context) or a tightly-coupled set (e.g., an audio/video conference through a central server that controls the participating nodes and that may provide media processing services such as audio mixing on behalf of some of its clients). There could be different types of multimedia controllers such as a first-party controller where the controller node takes part in the multimedia streaming (e.g., a PC controlling IP speakers) or a third-party controller where the controller node does not take part in the multimedia streaming (e.g., a PC controlling an IP Jukebox node and IP Speakers). Additionally, remote control devices can be utilized to activate a controller device in a multimedia network. In one embodiment, the control configuration 308 is resolved in two steps. In the first step, the appropriate mode of control of the participating multimedia devices (e.g., master/slave control, peer-to-peer control, loosely-coupled set, tightly-coupled set, etc.) is selected based on the request 300. In the second step, the appropriate control protocol is selected for every participating multimedia device (e.g. a local streaming protocol supported by a corresponding handler 222 or a UPnP control protocol supported by a corresponding handler 224, etc.).

A solution is derived by determining a bus and transport configuration (step 308), a data format configuration (step 310), and a timing and synchronization configuration (step 312). While FIG. 6 shows the configurations being determined simultaneously, it should be appreciated that the configurations could also be determined serially. In one embodiment, the hierarchical streaming model is utilized, where the entire network multimedia streaming configuration is resolved in two steps. In the first step, the device-to-device external connectivity is resolved as the set of the bus segments (or IP transports) connecting the devices, the data format and the payload type used for the devices connection. In the second step, each device's internal implementation corresponding to the external connections is finalized. Each area of configuration has its own range of potential solutions and the three configurations are interdependent. A change in one configuration area could affect the solution in the other configuration areas. For example, if the data format is changed, either a different bus may have to be used that supports that data format or a transform module may have to be added as discussed below.

If a possible solution cannot be found with the present configuration (step 314), another solution is tried. The solution path is backtracked to a point where another possible solution could be found. If all possible solutions have been tried (step 316), a failure message is returned (step 318). If a possible solution is found, the latency of the possible solution is checked to see if the target latency is met (step 320) and if other constraints (e.g., specified device, data format, quality of service, available bandwidth, available gateways, available transform nodes, available resources, etc.) are met (step 322). If the target latency is met and the other constraints are met the solution is finalized (step 324). Once the solution is finalized, the solution is translated into requirements for the individual components of the graph. In one embodiment, the solution is finalized by optimizing it. If the target latency is not met or other constraints are not met, another solution is tried. The solution path is backtracked to a point where another possible solution could be found. If all possible solutions have been tried (step 318), a failure message is returned (step 320).

For purposes of explanation, the steps of determining the bus and transport configuration, data format configuration, and the timing and synchronization configuration will be discussed separately.

To obtain the bus and transport configuration, the present invention checks to see if the user or client application has specified the bus and transport to use for each device in the request. If the device supports multiple buses or transports, the present invention tries one combination and in conjunction with a data format and timing and synchronization configuration, follows the steps outlined in FIG. 6 and determines if a solution can be finalized. If no solution can be found, another combination is tried until either a solution is found or all possible solutions have been tried.

For real-time connections, the present invention prioritizes transports based on the most efficient bus and data format combination (e.g. 1394+MPEG2 is the most efficient bus and compressed data format available on the device). For non-real-time connections, IP is used as much as possible, which minimizes the number of nodes to control. In situations where a source is connected to multiple sinks, the broadcast and multicast capabilities of the transports are utilized in order to optimize the system resource usage, and to achieve synchronization in processing related media streams.

To determine the data format configuration, the manager module 202 first determines if the user or client application has explicitly specified media formats on device connections. If no media format has been specified, devices being connected together are queried about their preferred modes (e.g. Audio and Video Multiplexed, Audio and Video Separate, Audio Only, Video Only). The intersection of device preferences is found. For example when a camera is connected to a TV and speakers, it is inferred that both audio and video are selected. In one embodiment, the common data format that results in a latency that is closest to the target latency is selected.

It is possible that there is no intersection of data formats between devices to be connected. When this occurs, transform modules (nodes) are added to transform a data format supported by a source device to a data format supported by a destination device to overcome the problem. For example, FIG. 8 shows a topology requested by a user or client application. In FIG. 8, the user wants to listen to soundtrack being played on a DVD player 800 using Bluetooth headphones 802. The bus/media format 804 of the DVD player 800 does not match the bus/media format 806 of the Bluetooth headphones 802. A transform module that transforms the DVD format into the PCM format that the Bluetooth headphone 802 supports is selected. An important factor in the selection of a transform module is the bandwidth required to transport the data encoded in a given format on a given bus. For example, in FIG. 8, assume that the DVD bandwidth (when both audio and video are encoded) is around several megabits per second and that the audio PCM bandwidth is around 44 kilobits per second. In order to reduce the bandwidth required in the greatest number of connections between the source node (e.g., the DVD node) and destination node (e.g., Bluetooth headphones 802), the search for a transform module is started at the DVD node (i.e., the node with the highest bandwidth requirement) and then expands outward from the DVD node (e.g., to the first gateway node, etc.). The latency of the combination is compared to the target latency to see if the latency falls within the target latency. If the target latency constraint and other constraints are met, that transform module is used. If constraints are not met and a device supports multiple data formats, another data format and transform module is selected and constraints are checked. If constraints are met, the transform module is used. If constraints are not met, another possible solution of data formats and transform modules is tried until either all possible solutions are tried or a solution is found.

Figure 9:
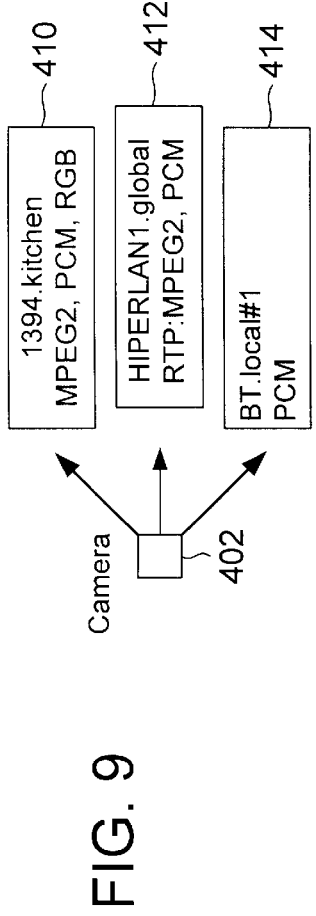
FIG. 9 is a block diagram illustrating a further connectivity problem that the present invention solves.

It is also possible that no intersection can be found between bus/media format of a source device and a destination device. FIG. 9 illustrates such a connectivity problem. In FIG. 9, the 1394 television 406 needs to be connected to the UPnP camera 402. However, there is no match between the bus/media formats 410, 412, 414 of the source device (i.e., UPnP camera 402) and the bus/media formats 416 of the destination device (i.e., 1394 television 406). In order to connect the two devices, at least one gateway must be found between the devices such that the topology with the gateways falls within all constraints. If a gateway is selected that results in a topology outside the constraints, another possible solution is tried until either a solution is found or all possible solutions have been tried.

Figure 10:
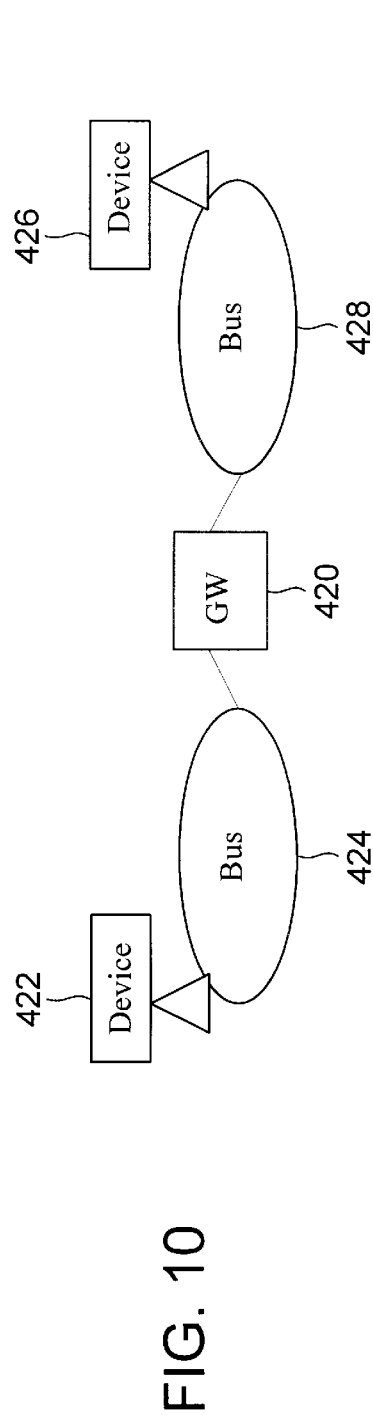
FIG. 10 is a block diagram illustrating an embodiment of a solution in accordance with the present invention of the connectivity problem illustrated in FIG. 9.

A gateway directory is used to find a gateway between devices. A gateway directory stores information about a bus' connectivity. The gateway directory specifies gateway device IDs and the bus segment IDs that the gateway bridges for each gateway. For many situations, a single gateway is sufficient to connect devices. For example, FIG. 10 shows an example where a single gateway 420 is used. Device 422 (e.g., UPnP camera 402) that is located on bus 424 is connected to device 426 (e.g., 1394 television 406) that is located on bus 428 through gateway 420. To find a gateway, the bus segment ID for bus 424 and the bus segment ID for bus 428 are found in the appropriate bus directory. The gateway is found by looking for a gateway in the gateway directory that lists the bus segment IDs of bus 424 and bus 428.

Figure 11:
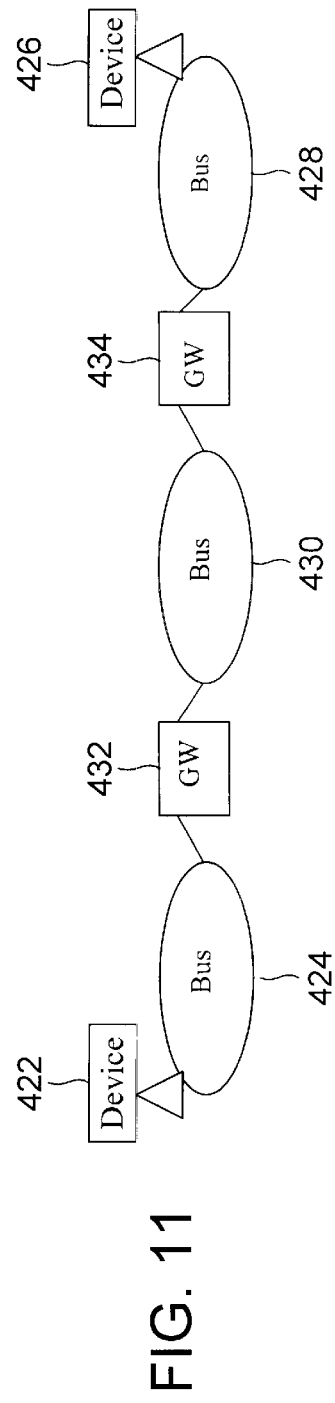
FIG. 11 is a block diagram illustrating an alternate embodiment of a solution in accordance with the present invention of the connectivity problem illustrated in FIG. 9.

If a single gateway cannot be found, a plurality of gateways is found. For example, FIG. 11 shows an example where device 422 is connected to device 426 through two gateways. Device 422 that is located on bus 424 is connected to bus 430 via gateway 432. Device 426 that is located on bus 428 is connected to bus 430 via gateway 434. To find multiple gateways, the gateway directories for bus 422 and bus 426 are searched to see if there is a common bus in the gateway directories. If there is a common bus, the devices and buses are connected to gateways as described above. The solution is checked to see if the target latency and other constraints are met. If the target latency and other constraints are not met another possible solution is tried until either a solution is found or all possible solutions have been tried. If no common bus can be found, another gateway is added and common buses are found similar to the description above.

The timing and synchronization configuration utilizes the functions of the clock object 248, time domain object 252, translation table object 254, and correlation table object 256 previously described for local streaming, but at the network level. The Network Time Protocol (NTP, RFC 1305) can also be utilized at the network level to synchronize the network clocks and to distribute the common time reference across the network. Once media formats, buses, and bus transports are determined, the timing and synchronization handler 208 configures clocks and rate-matchers where needed at transitions between time domains and creates the necessary translation/correlation tables used to translate clock readings to different time domains.

As previously mentioned, the solution is optimized in one embodiment. The manager module 202 optimizes the solution by minimizing performance parameters. These performance parameters include the number of gateways used to connect streaming nodes (e.g., source and destination devices), the number of transform nodes, the latency between the source and destination devices (i.e., streaming latency), the amount of network bandwidth used, the amount of memory used, the CPU (e.g., processor) usage, and other system resources used to connect the source device to the destination device. A weighted system approach is used in one embodiment wherein certain parameters take precedence over other parameters. For example, transports are prioritized based on the most efficient bus and data format combination for real-time connections. For non real-time connections, IP is used as much as possible to minimize the number of nodes to control.

A multimedia data streaming system that is capable of handling multiple networks (e.g., transports), data formats, control protocols, and clocks has been described. The system is capable of configuring modules and devices with minimal user input. All of the references cited herein, including patents, patent applications, and publications, are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for connecting a plurality of streaming nodes in a streaming graph in a network environment comprising the steps of:
   determining a set of connection constraints for a connection between streaming nodes from a first set comprising a target latency between streaming nodes, gateways available, transform nodes available, and connection bandwidth available;
   selecting at least one performance parameter to optimize for the streaming graph;
   connecting the streaming nodes if the set of connection constraints is satisfied; and
   optimizing the at least one performance parameter.

2. The method of claim 1 wherein the step of determining the set of connection constraints from the set comprising a target latency between streaming nodes, gateways available, transform nodes available, and connection bandwidth available further includes the step of determining the set of connection constraints from a second set comprising a set of other network system hardware and software resources available.

3. The method of claim 1 further comprising the steps of:
   determining if each streaming node resides on a first bus;
   for each streaming node that resides on a second bus:
      determining if at least one first gateway exists to connect the first bus to the second bus; and
      if at least one first gateway exists:
         connecting the first bus and the second bus to the first gateway if the set of connection constraints is satisfied.

4. The method of claim 1 wherein the streaming nodes and connections between streaming nodes form a topology and wherein a record is kept of a change to the topology when a connection is made and when a connection is broken such that if the set of connection constraints is not satisfied, the topology prior to the change is recovered.

5. The method of claim 3 further comprising the steps of:
   if there is no first gateway:
      determining if there is a second gateway to connect the first bus to a common bus;
      determining if there is a third gateway to connect the second bus to the common bus; and
      if at least one common bus exists:
         connecting the second gateway to the first bus and the common bus and connecting the third gateway to the second bus and the common bus if the set of connection constraints is satisfied.

6. The method of claim 5 wherein at least one of the streaming nodes has a plurality of bus types, the method further comprising the step of:
   if one of the bus types and common bus is an IP bus:
      using the IP bus if the set of connection constraints is satisfied.

7. The method of claim 5 wherein the step of connecting the second gateway to the first bus and the common bus and connecting the third gateway to the second bus and the common bus if the set of connection constraints is satisfied further comprises the step of selecting the common bus corresponding to a latency that is closest to a target latency.

8. A method for connecting a plurality of streaming nodes in a streaming graph in a network environment comprising the steps of:

determining a set of connection constraints for a connection between streaming nodes;

selecting at least one performance parameter to optimize for the streaming graph;

connecting the streaming nodes if the set of connection constraints is satisfied; and optimizing the at least one performance parameter, the step of optimizing the at least one performance parameter comprises the step of minimizing at least one of a first number of gateways used to connect the streaming nodes, a second number of transform nodes used to connect the streaming nodes, a streaming latency, a first amount of network bandwidth used, a second amount of memory used, and processor usage.

9. A method for connecting a plurality of streaming nodes in a streaming graph in a network environment wherein each streaming node has at least one data format, the method comprising the steps of:

determining a set of connection constraints for a connection between streaming nodes;

determining a first range of data formats a source streaming node in a streaming path supports;

determining a second range of data formats a destination streaming node in a streaming path supports;

if at least one common data format exists between the first range and the second range:
determining a common data format to use; and if no common data format exists between the first range and the second range:
determining at least one transform node to transform a first data format in the first range to a second data format in the second range;

selecting at least one performance parameter to optimize for the streaming graph;

connecting the streaming nodes if the set of connection constraints is satisfied; and optimizing the at least one performance parameter.

10. The method of claim 9 wherein the set of connection constraints comprises a target latency and wherein the step of connecting the first bus and the second bus to the first gateway if the set of connection constraints is satisfied comprises the steps of:

determining if a latency of the connection between streaming nodes with the first gateway and the transform node is less than the target latency; and connecting the first bus and the second bus to the first gateway and connecting the transform node between the source streaming node and the destination streaming node if the latency is less than the target latency.

11. The method of claim 10 wherein the step of determining a common data format to use comprises the steps of: determining a latency required to transport data between the first node and the second node using the common data format; and selecting the common data format that has a latency that is closest to the target latency.

12. A computer-readable medium having computer executable instructions for performing steps to connect a source endpoint to a destination endpoint in a streaming graph based upon a user's intent, the steps comprising:

determining a set of connection constraints for a connection between the source endpoint and the destination endpoint;

determining source connection parameters;

determining destination connection parameters;

selecting a source bus from the source connection parameters;

selecting a destination bus from the destination connection parameters;

selecting a source media format from the source connection parameters;

selecting a destination media format from the destination connection parameters;

selecting at least one gateway if the source bus and the destination bus are different such that the set of connection constraints is satisfied;

connecting the source bus to one of the at least one gateway and the destination bus;

connecting the destination bus to one of the at least one gateway and the source bus; and if the source media format and the destination media format are different:
selecting at least one transform node; and
connecting the transform node to one of the source endpoint and the destination endpoint.

13. The computer-readable medium of claim 12 wherein the step of determining the set of connection constraints comprises the step of determining the set of connection constraints from a first set comprising a target latency between streaming nodes, gateways available, transform nodes available, and connection bandwidth available.

14. The computer-readable medium of claim 12 having further computer-executable instructions for performing the steps comprising:

selecting at least one performance parameter to optimize for the streaming graph; and optimizing the at least one performance parameter.

15. The computer-readable medium of claim 14 wherein the step of optimizing the at least one performance parameter comprises the step of minimizing at least one of a first number of gateways used to connect the streaming nodes, a second number of transform nodes used to connect the streaming nodes, a streaming latency, a first amount of network bandwidth used, a second amount of memory used, and processor usage.

16. The computer-readable medium of claim 12 having further computer-executable instructions for performing the step comprising determining a control configuration.

17. The computer-readable medium of claim 12 wherein the step of determining source connection parameters comprises the steps of:

determining source buses that the source endpoint supports; and determining source media formats that the source endpoint supports.

18. The computer-readable medium of claim 12 wherein the step of determining destination connection parameters comprises the steps of:

determining destination buses that the destination endpoint supports; and determining destination media formats that the destination endpoint supports.

19. The computer-readable medium of claim 12 wherein the steps of selecting the source bus and the source media format comprises the steps of:

determining if the user has specified the source bus and the source media format;

if the user has specified the source bus, selecting the source bus the user has specified;

if the user has not specified the source bus:
  if the user has specified the source media format, selecting a source bus that supports the source media format; and
  if the user has not specified the source media format, selecting a source bus and a source media format such that the set of connection constraints is satisfied.

20. The computer-readable medium of claim 12 wherein the steps of selecting the destination bus and the destination media format comprises the steps of:
  determining if the user has specified the destination bus and the destination media format;
  if the user has specified the destination bus, selecting the destination bus the user has specified;
  if the user has not specified the destination bus:
    if the user has specified the destination media format, selecting a destination bus that supports the destination media format; and
    if the user has not specified the destination media format, selecting a destination bus and a destination media format such that set of connection constraints is satisfied.

21. The computer readable medium of claim 12 wherein the step of determining a set of connection constraints for a connection between the source endpoint and the destination endpoint comprises the step of determining a targeted latency.

22. The computer readable medium of claim 21 wherein the step of determining the targeted latency comprises the steps of:
  selecting a target latency of approximately one second if the source endpoint is live and the destination endpoint is live and the connection is a one-way connection;
  selecting a target latency of approximately two hundred milliseconds if the source endpoint is live and the destination endpoint is live and the connection is a two-way connection; and
  selecting a target latency of approximately three seconds if the source endpoint is storage and the destination endpoint is live.

23. The computer readable medium of claim 22 wherein the step of determining the targeted latency further comprises the steps of:
  if the source endpoint is live and the destination endpoint is storage:
    selecting a target latency such that the destination endpoint does not overrun.

24. A method for streaming data from a source streaming endpoint to a destination streaming endpoint in a streaming graph in a network environment having multiple clocks in response to receiving a user's request comprising:
  determining a set of connection constraints for a connection between streaming nodes;
  selecting at least one performance parameter to optimize for the streaming graph;
  connecting the streaming nodes if the set of connection constraints is satisfied;
  optimizing the at least one performance parameter;
  determining each device used to connect the source streaming endpoint to the destination streaming endpoint to satisfy the user's request;
  determining a control configuration;
  commanding at least one control handler to control at least one device;
  commanding a transport handler to configure a transport configuration for each device;
  commanding a data format handler to perform commonly used data type specific operations for at least one of the devices; and
  connecting the devices if the set of connection constraints is satisfied.

25. The method of claim 24 wherein the step of determining the set of connection constraints comprises the step of determining the set of connection constraints from a first set comprising a target latency between streaming nodes, gateways available, transform nodes available, and connection bandwidth available.

26. The method of claim 25 wherein the step of determining the set of connection constraints from the set comprising a target latency between streaming nodes, gateways available, transform nodes available, and connection bandwidth available further includes the step of determining the set of connection constraints from a second set comprising a set of other network system hardware and software resources available.

27. The method of claim 24 wherein the step of optimizing the at least one performance parameter comprises the step of minimizing at least one of a first number of gateways used to connect the streaming nodes, a second number of transform nodes used to connect the streaming nodes, a streaming latency, a first amount of network bandwidth used, a second amount of memory used, and processor usage.

28. The method of claim 24 further comprising the step of commanding a timing and synchronization handler to configure the multiple clocks.

29. The method of claim 28 wherein the step of commanding a timing and synchronization handler to configure the multiple clocks further comprises the step of providing at least one of a translation table and a correlation table for determining a relationship between a plurality of the multiple clocks.

30. The method of claim 24 wherein the step of commanding a data format handler to perform commonly used data type specific operations comprises the step of commanding the data format handler to perform at least one of translating time and space, validating and translating frames, and providing descriptor information.

31. The method of claim 30 wherein the step of performing at least one of transforming time and space, validating and translating frames, and providing descriptor information further comprises the step of validating a data format.

32. The method of claim 30 wherein the step of translating time and space comprises the step of performing at least one of determining how much data corresponds to a given amount of time and determining how a timestamp and duration translates to a frame size.

33. The method of claim 30 wherein the step of validating and translating frames comprises the step of performing at least one of
  validating a frame alignment and a frame size based on at least one of a negotiated framing, a negotiated timing interval, and interpreting and migrating flags on frames and negotiating framing based on data format restrictions such as size, stepping, alignment, and compression.

34. The method of claim 24 further comprising the step of adding a transformation module if a source data format is different from a destination data format.

35. The method of claim 24 further comprising the step of commanding a local domain bus topology handler to find an optimal path between at least two of the devices used to connect the source streaming endpoint to the destination streaming endpoint.

36. The method of claim 24 wherein the source streaming endpoint resides on a first bus and the step of determining each device used to connect the source streaming endpoint to the destination streaming endpoint to satisfy the user's request further comprises the steps of:
determining if the destination streaming endpoint resides on the first bus;
if the destination streaming node resides on a second bus:
determining if at least one first gateway exists to connect the first bus to the second bus;
if at least one first gateway exists:
connecting the first bus and the second bus to the first gateway if set of connection constraints is satisfied.

37. The method of claim 36 wherein each of the source streaming endpoint and the destination streaming endpoint has at least one data format, the method further comprising the steps of:
determining a first range of data formats the source streaming endpoint supports;
determining a second range of data formats the destination streaming endpoint supports;
if at least one common data format exists between the first range and the second range:
determining a common data format to use; and
if no common data format exists between the first range and the second range:
determining at least one transform module to transform a first data format in the first range to a second data format in the second range.

38. The method of claim 37 wherein the set of connection constraints comprises a target latency and wherein the step of connecting the first bus and the second bus to the first gateway if the set of connection constraints is satisfied comprises the step of:
determining if a latency of the connection between the source streaming endpoint and the destination streaming endpoint with the first gateway and the transform module is less than the target latency; and
connecting the first bus and the second bus to the first gateway and connecting the transform module between the source streaming endpoint and the destination streaming endpoint if the latency is less than the target latency.

39. The method of claim 38 wherein the step of determining a common data format to use comprises the steps of:
determining a latency required to transport data between the source streaming endpoint and the destination streaming endpoint using the common data format; and selecting the common data format that has a latency that is closest to the target latency.

40. The method of claim 36 further comprising the steps of:
if there is no first gateway:
determining if there is a second gateway to connect the first bus to a common bus;
determining if there is a third gateway to connect the second bus to the common bus;
if at least one common bus exists:
connecting the second gateway to the first bus and the common bus and connecting the third gateway to the second bus and the common bus if the set of connection constraints is satisfied.

41. The method of claim 40 wherein at least one of the source streaming endpoint and the destination streaming endpoint has a plurality of bus types, the method further comprising the step of:
if one of the bus types and common bus is an IP bus:
using the IP bus if the set of connection constraints is satisfied.

42. The method of claim 40 wherein the step of connecting the second gateway to the first bus and the common bus and connecting the third gateway to the second bus and the common bus if the set of connection constraints is satisfied further comprises the step of selecting the common bus corresponding to a latency that is closest to a target latency.

43. The method of claim 36 wherein the source streaming endpoint and the destination streaming endpoint and connections between the source streaming endpoint and the destination streaming endpoint form a topology and wherein a record is kept of a change to the topology when a connection is made and when a connection is broken such that if the connection constraints are not satisfied, the topology prior to the change is recovered.

44. The method of claim 24 wherein the step of commanding at least one control handler to control at least one device comprises the step of commanding at least one of a local streaming handler and a UPnP handler to control at least one device.

45. The method of claim 44 wherein the local streaming handler in response to receiving a command to control at least one device performs the steps of:
determining a timing configuration;
determining a data flow configuration;
determining a control configuration;
informing each device what control functions that device is to perform; and
commanding each device to process the data in response to an external command to stream data.

46. The method of claim 45 wherein the step of determining a data flow configuration comprises:
determining at least one pipe boundary; and
determining at least one pipe content.

47. The method of claim 46 wherein the step of determining at least one pipe content comprises:
specifying a frame size of data flowing through the pipe; and
specifying a memory allocator object to allocate memory.

48. The method of claim 45 wherein the step of determining a timing configuration comprises:
determining time domain configuration; and
if a number of time domains in the time domain configuration is at least two:
selecting at least one synchronization location; and
selecting at least one synchronization algorithm.

49. The method of claim 48 further comprising the step of commanding at least one object to rate match between each time domain.

50. The method of claim 48 wherein the step of selecting at least one synchronization location comprises:
determining at least one device having at least one rendering stream endpoint that renders the data; and
selecting the at least one rendering stream endpoint to be the at least one synchronization location.

51. The method of claim 48 wherein each device controlled by the local streaming handler is part of a graph and the step of determining a time domain configuration comprises assigning streaming endpoints located within the graph to at least one of a number of time domains.

52. The method of claim 51 wherein the step of assigning streaming endpoints comprises:

assigning a first streaming endpoint to a first time domain;

assigning a streaming endpoint connected to the first streaming endpoint to the first time domain if the second streaming endpoint is not independent of the first streaming endpoint; and assigning each streaming endpoint that does not belong to an other time domain and that can be independent of the first streaming endpoint to the first time domain.

53. The method of claim 52 wherein each time domain exposes a time domain clock and wherein the step of assigning streaming endpoints further comprises:

for each streaming endpoint that belongs to a second time domain that is connected to the first streaming endpoint:

if one of a second time domain clock and a first time domain clock can slave to the other of the second time domain clock and the first time domain clock:

merging the second time domain and the first time domain; and defining a master clock to be the other of the second time domain clock and the first time domain clock;

if one of a second time domain clock and a first time domain clock cannot slave to the other of the second time domain clock and the first time domain clock:

inserting a rate matcher between the streaming endpoint that belongs to a second time domain that is connected to the first streaming endpoint and the first streaming endpoint.

* * * * *